United States Patent
Strum et al.

(10) Patent No.: US 7,426,527 B2
(45) Date of Patent: Sep. 16, 2008

(54) RANDOM NUMBER GENERATOR AND METHOD FOR GENERATING A RANDOM NUMBER

(75) Inventors: Thomas Strum, Kirchheim (DE); Guido Stromberg, Munich (DE); Ralf Brederlow, Poing (DE); Werner Weber, Munich (DE)

(73) Assignee: Infineon Technologies AG (DE)

( * ) Notice: Subject to any disclaimer, the term of this patent is extended or adjusted under 35 U.S.C. 154(b) by 611 days.

(21) Appl. No.: 10/948,627

(22) Filed: Sep. 23, 2004

(65) Prior Publication Data

US 2005/0125471 A1 Jun. 9, 2005

(30) Foreign Application Priority Data

Sep. 24, 2003 (DE) .................... 103 44 327

(51) Int. Cl.
*G06J 1/00* (2006.01)
*G06F 7/38* (2006.01)
(52) U.S. Cl. .......................... 708/3; 708/256
(58) Field of Classification Search ......... 708/250–256, 708/3
See application file for complete search history.

(56) References Cited

U.S. PATENT DOCUMENTS 3,746,847 A * 7/1973 Maritsas ............... 708/250
3,811,038 A * 5/1974 Reddaway ............ 708/250
4,355,366 A * 10/1982 Porter .................. 708/255

FOREIGN PATENT DOCUMENTS

| DE | 199 26 640 A1 | 12/2000 |
|----|---|---|
| DE | 101 17 362 A1 | 10/2002 |
| WO | WO-02/082256 A2 | 10/2002 |

OTHER PUBLICATIONS

Markus Dichtl and Norbert Janssen; "A High Quality Physical Random Number Generator"; Eurosmart 2000 Security Conference Proceedings, Jun. 2000.
W. Killman and W. Schindler; "A proposal for: Functionality classes and evaluation methodology for true (physical) random number generators"; Technical Report Version 3.1, Federal Office for Security in Information Technology, Bonn, Sep. 2001.
P. Ruβe; "Schaltungsentwurf und Synthese eines adaptiven Pradiktionsfilters sowie eines Algorithmus zur Quantilbildung (Circuit design and synthesis of an adaptive predictive filter and an algorithm for quantile formation)"; study at the University of Dortmund, Sep. 2002.

* cited by examiner

*Primary Examiner*—Tan V Mai
(74) *Attorney, Agent, or Firm*—Dickstein, Shapiro, LLP.

(57) ABSTRACT

Random number generator having a transistor that generates an analog random telegraph signal (RTS) having a first or second signal state, a RTS detection unit for detecting the RTS generated by the transistor, a RTS sampling unit that supersamples the RTS detected by the RTS detection unit and thus generates a digitized RTS, a signal state duration detection unit that determines, from the digitized RTS, a first time variable representing the time duration of at least one first signal state of the generated RTS and a second time variable representing the time duration of at least one second signal state of the generated RTS, and a random number conversion unit, which is coupled to the signal state duration detection unit, and that generates a random number from the first time variable and the second time variable.

14 Claims, 5 Drawing Sheets

RANDOM NUMBER GENERATOR AND METHOD FOR GENERATING A RANDOM NUMBER

CROSS-REFERENCE TO RELATED APPLICATION

This application claims priority to German Patent Application Serial No. 103 44 327.4-53 filed Sep. 24, 2003.

FIELD OF THE INVENTION

The invention relates to a random number generator and to a method for generating a random number.

BACKGROUND OF THE INVENTION

Random numbers are used in a multiplicity of information-technological applications, for example in the context of simulation methods, global optimization methods or local optimization methods, genetic algorithms, etc.

The use of random numbers is of particular importance in the case of cryptographic methods used inter alia for smart cards, security controllers or so-called Trusted Platform Modules (TPM).

The random number sequences that are generated deterministically by a pseudo-random number generator can be completely reconstructed by observation of a certain number of sequence elements.

Whereas so-called pseudo-random number generators based on deterministic mathematical algorithms are often used in the case of the abovementioned information-technological applications such as the simulation methods and the optimization methods or the genetic algorithms, so-called True Random Number Generators (TRNG) are required particularly in cryptography in order to be able to ensure a sufficiently high cryptographic security. A true random number generator is usually based on the observation (measurement) of physical effects, for example the radioactive decay of molecules or atoms.

DE 101 17 362 A1 describes a differential stage having one or a plurality of noisy transistors that generates or generate a so-called Random Telegraph Signal (RTS signal). The generated random telegraph signal has two states, each state of the RTS signal having a known random distribution, i.e. an associated known statistical probability density function, although the random distributions of the two signal states need not be identical.

In accordance with DE 101 17 362 A1, a digitized RTS signal is formed from the analog RTS signal by means of sampling and a binary random number sequence is generated from the sampled values, the sequence elements of said binary random number sequence being stochastically independent under predetermined criteria.

In accordance with DE 101 17 362 A1, the RTS signal is sampled with a temporal sampling interval $\Delta T$ that is at least twice as long as the average lifetime of a signal state of the RTS signal. The sampling interval $\Delta T$ is thus long enough to ensure the independence of the samples to a sufficient extent.

An imbalance in the number of generated first binary values ("zeros") and second binary values ("ones"), i.e. clearly a bias, may occur on account of the differences in the average lifetimes of the signal states of the RTS signal.

If the bias is too large, which cannot be exactly predicted in the production of electronic chips and thus of the respective noisy transistors, then a functionality class P2 required for example in W. Killmann and W. Schindler, A proposal for: Functionality classes and evaluation methodology for true (physical) random number generators, Technical Report Version 3.1, Federal Office for Security in Information Technology, Bonn, September 2001, i.e. a quality of the transistors formed that suffices for a minimum cryptographic security, cannot be reliably complied with.

Moreover, the random number rate decreases as the sampling interval $\Delta T$ increases.

P. Ruβe, Schaltungsentwurf und Synthese eines adaptiven Prädiktionsfilters sowie eines Algorithmus zur Quantilbildung [Circuit design and synthesis of an adaptive predictive filter and an algorithm for quantile formation], study at the University of Dortmund, September 2002 describes, for a multi-bit generator, an adaptation of the quantile variables used therein.

M. Dichtl and N. Janssen, A high quality physical random number generator, in Eurosmart 2000 Security Conference Proceedings, June 2000 describes the construction and the functioning of a digital postprocessing unit.

SUMMARY OF THE INVENTION

Thus, the invention is based on the problem of specifying a random number generator and a method for generating a random number using an RTS signal in the case of which the quality of the generated random number is increased.

A random number generator has at least one noisy transistor that generates an analog random telegraph signal (referred to hereinafter as RTS signal). The RTS signal has a first signal state representing a first binary value or a second signal state representing a second binary value.

In principle, an arbitrary number of transistors may be provided in the random number generator, as described in DE 101 17 362 A1.

Furthermore, a random telegraph signal detection unit coupled to the at least one transistor is provided, and is set up for detecting the random telegraph signal generated by the transistor. The analog random telegraph signal is sampled by means of a random telegraph signal sampling unit, the sampling frequency being greater than twice the statistically average lifetime of a signal state of the RTS signal, i.e. twice as long as the statistically average lifetime of the first signal state or of the second signal state.

To put it another way, this means that the RTS signal generated by the transistor is supersampled by means of the random telegraph signal sampling unit. The supersampled RTS signal forms a digitized random telegraph signal. Furthermore, a signal state duration detection unit is provided in the random number generator, and is coupled to the random telegraph signal sampling unit and is set up in such a way that it determines, from the digitized, supersampled random telegraph signal, a first time variable representing a signal time duration of at least one first signal state of the generated random telegraph signal and a second time variable representing a signal time duration of at least one second signal state of the generated random telegraph signal. A random number is generated from the first time variable and from the second time variable by means of a random number conversion unit that is likewise provided in the random number generator and is coupled to the signal state duration detection unit.

In a method for generating a random number, an analog random telegraph signal is detected and the analog random telegraph signal detected is supersampled, so that a digitized random telegraph signal is generated. A first time variable representing the signal time duration of at least one first signal state of the generated random telegraph signal and a second time variable representing the signal time duration of at least one second signal state of the generated random telegraph signal are determined from the digitized random telegraph signal. A random number is generated from the first time variable and from the second time variable.

Clearly, the invention can be seen in the fact that in order to generate random numbers, the "decay times", to put it another way the signal time durations, of changing physical states of an RTS signal are observed, each signal state of the RTS signal having a fixedly predetermined probability distribution of the respective signal state duration, although the probability distribution of the signal state duration may differ from signal state to signal state.

The invention is based on the insight that the actually stochastically independent elements of the RTS signal generated by a noisy transistor are the decay times, i.e. signal time durations, of the signal states of the RTS signal. Therefore, in contrast to the prior art, the invention does not use the samples of the RTS signal themselves as random variables, but rather the measured time durations that are determined, preferably counted, by means of the signal state duration detection unit, said time durations exhibiting stochastic exponential distribution.

Thus, according to the invention, the stochastic quality of the generated random number is increased further in comparison with the prior art.

The invention is suitable in particular for generating random numbers that can be used in the context of cryptographic security methods, for example for generating cryptographic keys or in the context of cryptographic security mechanisms. In particular, the invention is suitable for use in smart cards, in a security controller or in trusted platform modules (TPM).

Preferably, the analog RTS signal is sampled with a sampling interval $\Delta T$ that is significantly shorter than the statistically average lifetime of the first signal state of the RTS signal or of the second signal state of the RTS signal.

Preferably, the sampling interval $\Delta T$ is a factor of 100, particularly preferably a factor of 1000, shorter than the average lifetime of the two signal states, in particular than the shorter lifetime of the two signal states of the RTS signal.

To put it another way, this means that, on average statistically, at least 100, preferably at least 1000, samplings are carried out in each signal state of the RTS signal.

The developments of the invention that are described below relate both to the random number generator and to the method for generating a random number.

The random number generator and also the method for generating a random number may optionally be realized completely in hardware, i.e. by means of a specific electronic circuit, or in software, i.e. by means of a computer program, or optionally in arbitrary parts in hardware and in software.

In accordance with one refinement of the invention, the signal state duration detection unit has a first counter for counting successive samples of the digitized RTS signal which represent the first signal state of the generated RTS signal. Furthermore, a second counter for counting successive samples of the digitized RTS signal which represent the second signal state of the generated RTS signal is provided in the signal state duration detection unit.

Furthermore, a random number generator failure determining unit may be provided, which is set up for determining a failure or an increased risk of failure of the random number generator.

In accordance with another refinement, a warning device coupled to the random number generator failure determining unit is provided. The warning device is set up for generating a warning signal if a failure of the random number generator has been determined or if an increased risk of failure of the random number generator has been determined. The warning device preferably has a loudspeaker that emits a beep warning tone or else a spoken warning voice message. As an alternative, a lamp or a light-emitting diode is provided for outputting a warning light signal.

In this way, it is possible for the user already to be informed early about an imminent failure or an actually determined failure of the random number generator, so that said user can initiate countermeasures early.

Furthermore, the random number conversion unit may have a ring memory, in which the counter values of the first counter and the counter values of the second counter are stored. The use of a ring memory has the advantage, according to the invention, of a very simple implementation of the random number conversion unit.

Furthermore, a quantization unit may be provided, which is coupled to the signal state duration detection unit and quantizes the first counter value and/or the second counter value into a plurality of binary values that are fed to the random number conversion unit.

Provision of the quantization unit makes it possible to derive a plurality of bits of a random number sequence with respect to a generated time duration of a signal state of the RTS signal.

The data rate that can be generated by means of the random number generator is considerably increased in this way.

In accordance with another refinement of the invention, it is provided that the quantization unit is set up in such a way that the quantization threshold values, which serve for the quantization of the counter readings or the time durations of the signal states, are configured in variable fashion. This makes it possible, even in the case of average lifetimes of the signal states that are not known exactly and in the case of fluctuating physical boundary conditions, to enable adaptation of a superposed signal interference component and quantization errors through suitable adaptation of the quantization threshold values.

BRIEF DESCRIPTION OF THE DRAWINGS

An exemplary embodiment of the invention is illustrated in the figures and is explained in more detail below.

DETAILED DESCRIPTION OF PREFERRED EMBODIMENTS OF THE INVENTION

Figure 1:
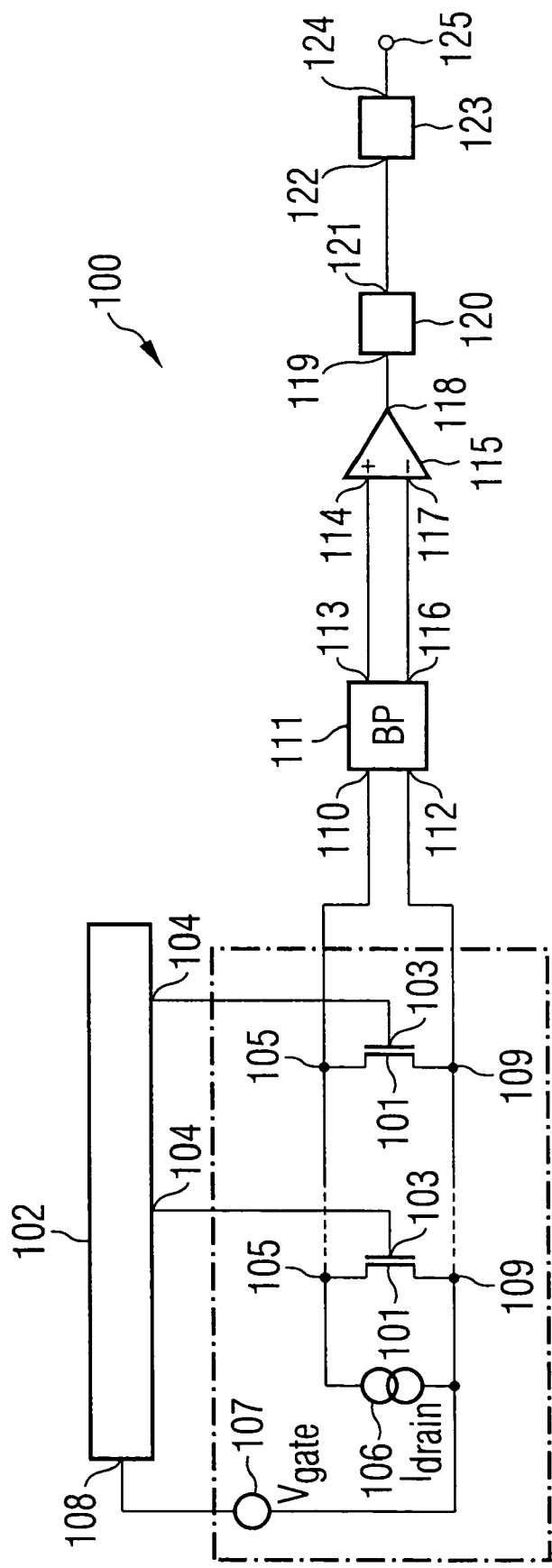
FIG. 1 shows a schematic diagram of a random number generator in accordance with an exemplary embodiment of the invention.

FIG. 1 shows a random number generator 100 in accordance with a preferred exemplary embodiment of the invention.

The random number generator 100 has a multiplicity of CMOS field effect transistors 101 as a multiplicity of semiconductor components and also a field effect transistor selection unit 102 for selecting at least one CMOS field effect transistor 101.

The CMOS field effect transistors 101 have a gate length of 0.13 μm and a gate width of likewise 0.13 μm. Each CMOS field effect transistor 101 has at least one electrically active defect site that generates a noise behavior illustrated symbolically as noise signal 201 in the temporal illustration in FIG. 2a, the so-called RTS signal.

Figure 2B:
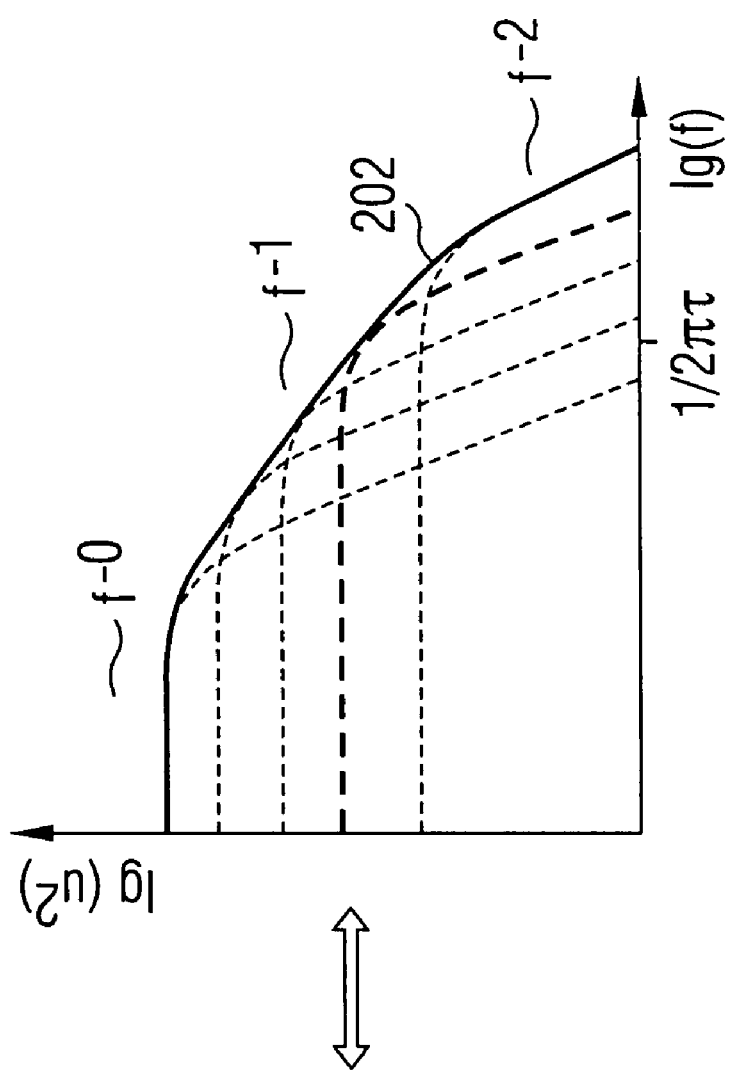
FIGS. 2a and 2b show a signal profile of an RTS signal in a semiconductor component in the temporal profile (FIG. 2a) and in the frequency domain (FIG. 2b)
Figure 2A:
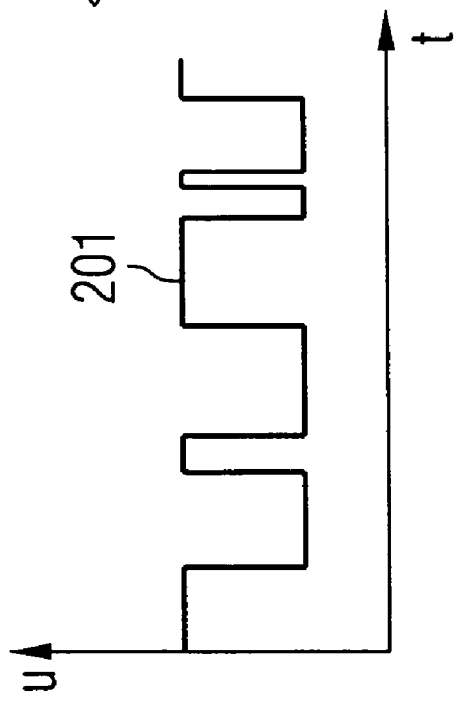

The noise signal 201, i.e. the RTS signal 201, clearly represents a generation-recombination noise as a random signal in the time domain along the time axis t. FIG. 2b shows the analog RTS signal 201 in a logarithmized representation in the frequency spectrum as RTS frequency signal 202.

Figure 3:
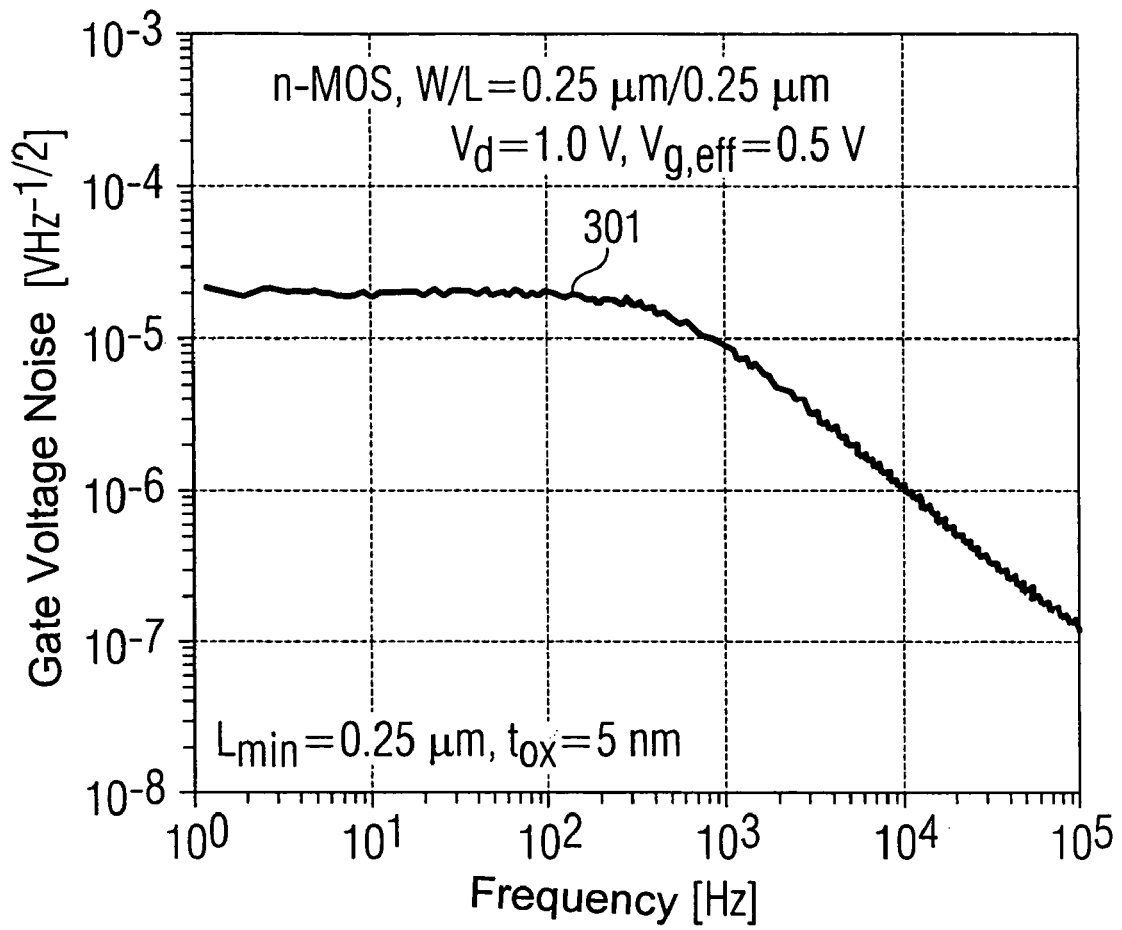
FIG. 3 shows a noise spectrum of minimal CMOS field effect transistors, produced in a CMOS process with a minimum feature size of 0.25 µm.

FIG. 3 shows by way of example a noise spectrum 301 of CMOS field effect transistors that have been produced by means of a CMOS technology with a minimum feature size of 0.25 μm.

The gate terminal 103 of each CMOS field effect transistor 101 is in each case connected to an output 104 of the field effect transistor selection unit 102, which is clearly formed as a decoder.

Furthermore, the drain terminal 105 of each CMOS field effect transistor 101 is coupled to a current source 106. Via a voltage source 107 that provides a gate voltage $V_{Gate}$, an input 108 of the field effect transistor selection unit 102 is coupled to the source terminal 109 of each CMOS field effect transistor 101.

A CMOS field effect transistor 101 is selected by means of the field effect transistor selection unit 102 by the gate voltage $V_{Gate}$ being applied to the gate terminal 103 of the selected CMOS field effect transistor 101 or the selected CMOS field effect transistors 101.

The drain terminals 105 of all the CMOS field effect transistors 103 are coupled to a first input 110 of a bandpass filter 111. The source terminals 109 of all the CMOS field effect transistors 103 are coupled to a second input 112 of the bandpass filter 111.

A first output 113 of the bandpass filter 111 is coupled to the noninverting input 114 of a differential amplifier 115. Furthermore, a second output 116 of the bandpass filter 111 is coupled to the inverting input 117 of the differential amplifier 115.

Figure 5:
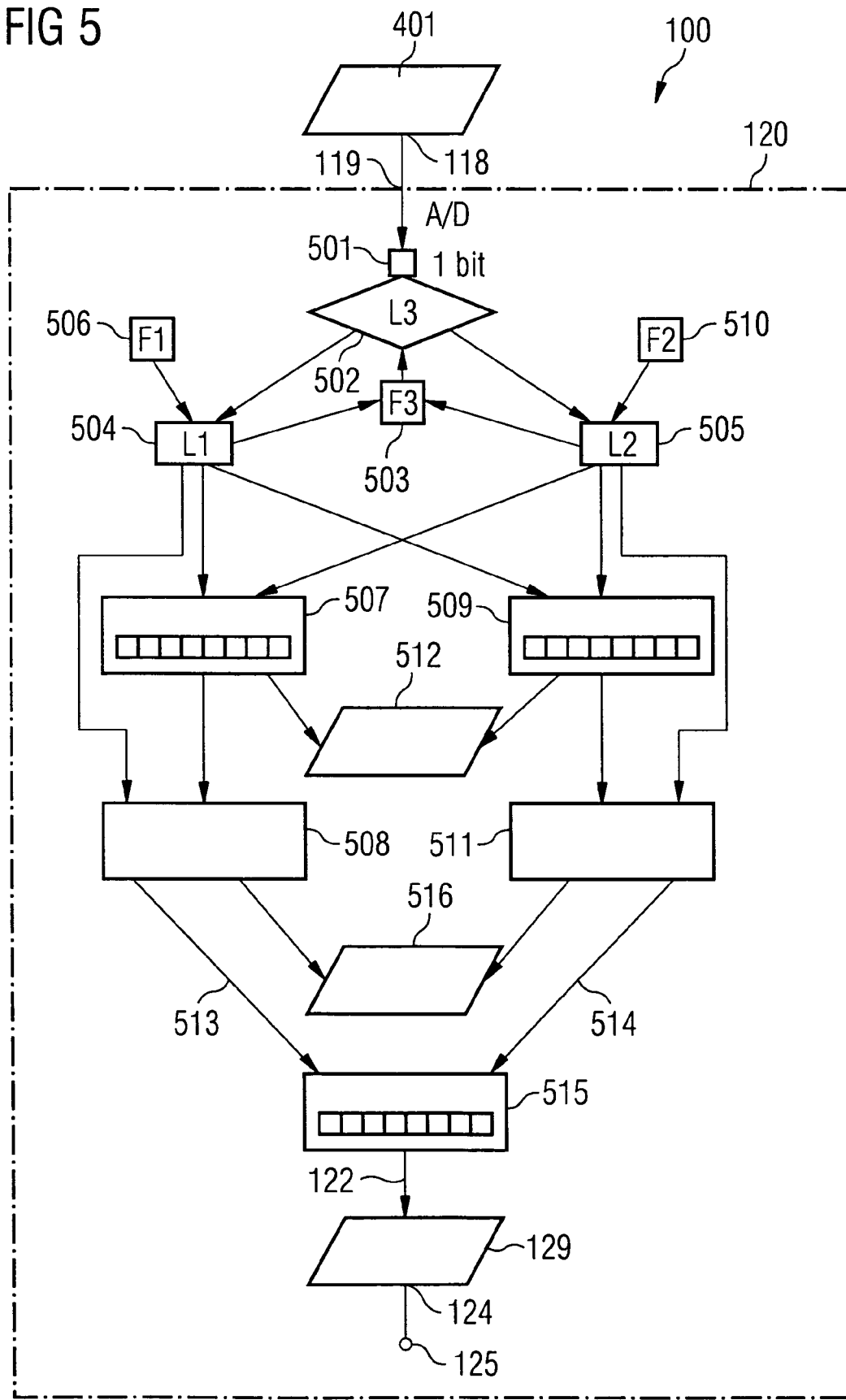
FIG. 5 shows a block diagram illustrating the model-driven postprocessing in detail.

The output 118 of the differential amplifier 115 is coupled to an input 119 of an intermediate processing unit 120, the structure of which is illustrated in detail in FIG. 5 and is explained in greater detail below. Random number bits are provided at an output 121 of the intermediate processing unit 120 and are fed to an input 122 of a digital postprocessing unit 123. The random number bit sequence 125 to be generated is provided at an output 124 of the digital postprocessing unit 123.

It should be noted in this connection that both the gate voltage $V_{Gate}$ and a reference voltage $V_{Ref}$ can optionally be varied or be readjusted, i.e. adapted, by means of an adjusting device (not illustrated) via an additional feedback loop.

In this case, the suitable states with respect to each gate voltage $V_{Gate}$ are stored in a memory (not illustrated) and these are altered in accordance with the ambient conditions.

Since the statistical behavior of the electrically active defect sites and the spatial arrangement thereof along the surface of the respective CMOS field effect transistor 101 are known, a number of CMOS field effect transistors 101 per electrical circuit which are required for a high yield of integrated circuits can be calculated in a simple manner.

Consequently, by means of the field effect transistor selection unit 102, a suitable CMOS field effect transistor 101 is selected on the basis of a calibration method carried out beforehand, the time behavior, i.e. the temporal alteration of the defect site states of the respective CMOS field effect transistor 101, being determined in the context of the calibration method.

What is obtained as the result of the calibration method is the CMOS field effect transistor 101 that is best suited to the random number generator 100, i.e. that CMOS field effect transistor 101 in the case of which the probability of a first occupation state P(1) is approximately equal to the probability of the presence of the second occupation state P(0).

In most cases the calibration method only has to be carried out once since the transition probability of the defect site in the respective CMOS field effect transistor 101, given a suitable construction of the voltage source 107 for the selected CMOS field effect transistor 101, is dependent only to a small extent on the external boundary conditions, for example a supply voltage fluctuation or a temperature fluctuation.

Since the time constant for the average transition time of the defect site from a first occupation state to a second occupation state, to put it another way the average lifetime thereof, is a function of the respectively applied gate voltage $V_{Gate}$, the time constant can be adjusted, i.e. set, within a certain scope by altering the respectively applied gate voltage $V_{Gate}$.

The capability of setting the time constant may be utilized in order to achieve the desired uniform distribution of the two probabilities P(0)=P(1)=0.5.

As an alternative, in order to attain the uniform distribution of the two probabilities P(0)=P(1)=0.5, it is possible to detect the change in the occupation state of a defect site either from the occupation state "occupied" to the occupation state "unoccupied" or from the occupation state "unoccupied" to the occupation state "occupied".

If a sufficient number of CMOS field effect transistors 101 are available as a possible source for the random number generator 100, then adjustment is not usually necessary since the number of available CMOS field effect transistors 101 can be set such that the multiplicity of CMOS field effect transistors 101 include with a probability of almost 100% a CMOS field effect transistor 101 which satisfies the desired condition of uniform distribution of the generated noise signal, i.e. P(0)=P(1)=0.5, with sufficient accuracy.

Since the CMOS field effect transistors 101 are very small field effect transistors anyway, the CMOS field effect transistors 101 that do not meet the desired condition scarcely take up chip area. The detailed configuration of the CMOS field effect transistors 101 set up as minimal transistors, and of the additionally provided units including the differential amplifier 115, can be gathered from DE 101 17 362 A1.

Furthermore, an alternative embodiment, which provides parallel generation of a random word, is likewise described in DE 101 17 362 A1 and provided as an alternative embodiment in accordance with the invention.

All that is essential according to the invention is that an RTS signal is present at the input 119 of the intermediate processing unit 120.

Figure 4:
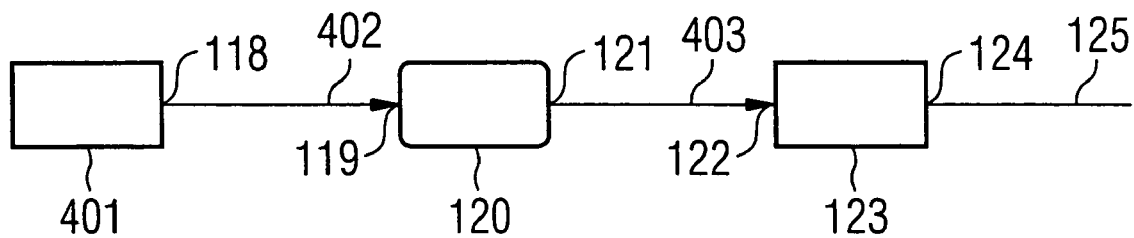
FIG. 4 shows a basic illustration of a model-driven postprocessing, according to the invention, of a generated RTS signal.

FIG. 4 shows the basic circuit diagram of the random number generator 100 according to the invention with model-driven postprocessing.

The components of the random number generator 100 illustrated in FIG. 1 in the signal path from the minimal transistors 101 that generate the RTS signal as far as the output 118 of the differential amplifier 115 are designated as physical random noise source 401 in FIG. 4. The RTS signal 402 generated by the physical random noise source 401 is fed to the intermediate processing unit 120 and the RTS signal 403 that has been subjected to intermediate processing, i.e. the intermediate random bit sequence 403, is fed to the digital postprocessing unit 123, which provides the random number bit sequence 125 at its output 124.

Since the physical properties and the stochastic properties derived therefrom of the physical random noise source 401 are known with the exception of a few parameters, the invention clearly provides a model-driven postprocessing of the analog RTS signal 402 that is still carried out before a digital postprocessing.

According to the invention, the physical random noise source 401 has the following properties:

The physical random noise source 401 generates an RTS signal 402, which changes over the course of time between two signal states, i.e. a first signal state a and a second signal state b.

Each signal state a and b has a temporal lifetime exhibiting exponential distribution and, after said lifetime has elapsed, a state change takes place, i.e. a change from a signal state a to a second signal state b and conversely from the second signal state b to the first signal state a.

Each "decay" of a signal state over the course of time is independent of the decay of every other signal state over the course of time.

The temporal average lifetimes of the two signal states a and b are designated as average lifetime $\tau_a$ of the first signal state a and as average lifetime $\tau_b$ of the second signal state b, respectively, in which case the following holds true to an approximation:

$$\tau_a, \tau_b \in [10^{-5}, 10^{-4}] \, [s], \qquad 0.3 \leq \frac{\tau_a}{\tau_b} \leq 3. \tag{1}$$

The average lifetimes $\tau_a$ and $\tau_b$ are prescribed by the physical construction of the physical random noise source 401 and may be regarded as stable to the greatest possible extent.

The physical random noise source 401 may be sampled randomly with a sampling interval $\Delta T$, where the following holds true:

$$\Delta T \in [3 \cdot 10^{-8}, 10^{-4}] [s]. \tag{2}$$

A binary output, i.e. an output of a binary value (0/1), is generated depending on the state of the physical random noise source 201 at a sampling instant.

The main effect described may additionally be superposed by white noise and by colored noise, the proportion of which is at most 20% to 30% (disturbance of the decay time of a signal state).

The generation of the binary output values, to put it another way of the 0/1 random number bit sequence, is carried out with the aid of the differential stage 115, in the case of which the difference is formed between two noise sources in accordance with the physical random noise source 401 illustrated in FIG. 1.

Generally, two paths $f_1$ and $f_2$ of the processes mentioned are considered, the following holding true:

$$f_1: \mathfrak{R} \to \{a_1, b_1\}, a_1 < b_1, \tag{3}$$

$$f_2: \mathfrak{R} \to \{a_2, b_2\}, a_2 < b_2. \tag{4}$$

The following holds true for the difference $g := f_1 - f_2$ between them $$g(t) = f_1(t) - f_2(t) \in \{a_1 - b_2, a_1 - a_2, b_1 - b_2, b_1 - a_2\} = \{c_1, c_2, c_3, c_4\} \tag{5}$$

Only the "normal case" with four different result values $c_1 < c_2 < c_3 < c_4$ is considered below, without restricting the general validity.

By means of threshold value decision, the result of the difference is in each case assigned a binary value, i.e. a first binary value ("0") or a second binary value ("1") in accordance with the following specification:

$$h(t) := \begin{cases} 0, & g(t) \in \{c_1, c_2\}, \\ 1, & g(t) \in \{c_3, c_4\} \end{cases}, \qquad t \in \mathfrak{R}. \tag{6}$$

Since the following result directly:

$$a_1 - b_2 < a_1 - a_2 < b_1 - a_2, \tag{7}$$

$$a_1 - b_2 < b_1 - b_2 < b_1 - a_2, \tag{8}$$

only two possible assignments exist with respect to $\{c_1, c_2, c_3, c_4\}$.

First Case:

$$c_1 = a_1 - b_2, c_2 = a_1 - a_2, c_3 = b_1 - b_2, c_4 = b_1 - a_2. \tag{9}$$

The following then holds true:

$$h(t) := \begin{cases} 0, & f_1(t) = a_1 \\ 1, & f_1(t) = b_1 \end{cases}, \qquad t \in \mathfrak{R}. \tag{10}$$

Second Case:

$$c_1 = a_1 - b_2, c_2 = b_1 - b_2, c_3 = a_1 - a_2, c_4 = b_1 - a_2. \tag{11}$$

The following then holds true:

$$h(t) := \begin{cases} 0, & f_2(t) = b_2, \\ 1, & f_2(t) = a_2 \end{cases}, \qquad t \in \mathfrak{R}. \tag{12}$$

This means that, in both cases, the binary value sequence is generated by precisely one path $f_1$ or $f_2$. Subsequently, it is therefore possible to derive the binary value sequence directly from the physical random noise source 201 described above even if a differential stage 115 is used in the technical realization of the physical random noise source 401.

The analog RTS signal 402 is sampled by means of an analog/digital converter (not shown) and thus digitized. The analog/digital converter carries out a supersampling of the RTS signal 202 generated by the physical random noise source 201, with a sampling interval $\Delta T \ll \tau_a, \tau_b$.

The digitized RTS signal 501 (cf. FIG. 5) is fed serially bit by bit to a first circuit logic unit 502. The first circuit logic unit 502 is set up in such a way that it checks whether a first flag 503 is set to a first binary value ("0"). If this is the case, then the present bit of the digitized RTS signal 501 is fed to a second circuit logic unit 504. If the first flag 503 is set to a second value ("1"), then the present bit of the digitized RTS signal 501 is fed from the first circuit logic unit 502 to a third circuit logic unit 505.

The second circuit logic unit 504 is set up in such a way that it checks, for a bit of the digitized RTS signal 501 fed to the second circuit logic unit 504, whether or not the value of the received bit corresponds to the value of a second flag 506. The value of the second flag 506 is a constant having the value "0". If the received bit of the digitized RTS signal 501 corresponds to the value of the second flag 506, i.e., to put it another way, if the received bit of the digitized RTS signal 501 has the value "0", then a first counter 507 coupled to the second circuit logic unit 504 (which counter is set up as a shift register) is incremented by the value "1". However, if the received bit of the digitized RTS signal 501 does not correspond to the value of the second flag 506, i.e. if the received bit of the digitized RTS signal 501 has the value "1", a first multi-bit bit generator 508 coupled to an output of the second circuit logic unit 504 and to an output of the first counter 507 and serving for reading out the present value of the first counter 507 is triggered and the value of a second counter 509 coupled to an output of the second circuit logic unit 504 and to an output of the third circuit logic unit 505, which second counter is likewise set up as a shift register, is set to the value "1" and the value of the first flag 503 is set to the value "1".

A second input of the first counter 507 is furthermore coupled to an output of the third circuit logic unit 505.

The third circuit logic unit 505 is set up in such a way that it checks whether a bit of the digitized RTS signal 501 received by the third circuit logic unit 505 corresponds to the value of a third flag 510. The third flag 510 is assigned the constant value "1". If the bit of the digitized RTS signal 501 received by the third circuit logic unit 505 corresponds to the value of the third flag 510, i.e. if the received bit of the digitized RTS signal 501 has the value "1", then the value of the second counter 509 is incremented by the value "1". If the received bit of the digitized RTS signal 501 does not correspond to the value of the third flag 510, i.e. if the received bit of the digitized RTS signal 501 has the value "0", a second multi-bit generator 511 coupled to an output of the third circuit logic unit 505 and to an output of the second counter 509 and serving for reading out the value of the second counter 509 is triggered and the first counter 507 is set to the value "1" by means of the third circuit logic unit 505. Furthermore, the value of the first flag 503 is set to the value "0".

If a counter overflow occurs in the case of the first counter 507 and/or in the case of the second counter 509, then a warning device 512 coupled to the two counters 507, 509 is triggered. The overflow of the respective counter 507, 509 is not implemented, rather the counter reading is maintained at the highest possible value in accordance with this exemplary embodiment.

The warning device 512 is set up in such a way that it warns against a possible failure of the random number generator 100. One possible reaction to an alerting or warning against a possible failure of the random number generator 100 is the turnoff, i.e. deactivation, of the random number generator 100.

The first multi-bit generator 508 and the second multi-bit generator 511 are in each case set up in such a way that the respective multi-bit generator 508, 511 reads out, at its resolution, the value of the counter 507 or 509 assigned to the respective multi-bit generator 508, 511.

As described in P. Ruße (cited above), using the counter reading read out, the multi-bit generator 508, 511, the structure of which will be explained in greater detail below, effects an adaptation of the quantile variables used internally in the respective multi-bit generator 508, 511 and, depending on the counter value, a generation of an output bit sequence 513 and 514, respectively.

It has been found that with the use of an adaptive quantile method in accordance with P. Ruße (cited above) for adapting the quantile variables of the multi-bit generators 508, 511, often a smaller bias is generated than in the case of fixedly predetermined quantile variables, which, however, are provided in an alternative configuration of the invention.

The reason for the smaller bias resides in quantization deviations that lead to a bias in the case of fixedly predetermined quantile variables, and in fluctuations of the physical random noise source 401 to which fixed quantile variables cannot react.

A first output bit sequence 513 is generated by the first multi-bit generator 508 and a second output bit sequence 514 is generated by the second multi-bit generator 511.

The multi-bit generators 508, 511 clearly represent a quantization unit, which is explained in greater detail below.

The output bits of the output bit sequences 513 and 514, respectively, are stored in a ring buffer memory 515 coupled to an output of the first multi-bit generator 508 and a second output of the second multi-bit generator 511.

Consequently, the output bits of the output bit sequences 513 and 514, respectively, that are generated with irregular clocking are clearly stored in the ring buffer memory 515.

The ring buffer memory 515 can be read in a manner clocked by a digital postprocessing unit 124. The data read from the ring buffer memory 515 are the data material for a functionality class P2 that is often required, as is described for example in W. Killmann and W. Schindler (cited above).

In accordance with this exemplary embodiment, the digital postprocessing unit 124 is set up in accordance with M. Dichtl and N. Janssen (cited above). The digital postprocessing unit 124 reads out the bits stored in the ring buffer memory 515 and subjects them to a digital postprocessing, as is described in M. Dichtl and N. Janssen (cite above).

Furthermore, a unit for quality control 516 is provided, which is coupled to an output of the first multi-bit generator 508 and to an output of the second multi-bit generator 511.

By means of the device for quality control 516, the quantile values of the first multi-bit generator 508 and of the second multi-bit generator 511 are read out for the purpose of quality control and for the purpose of comparison with other random number generators in a larger arrangement of random number generators.

For this purpose, according to the invention, what is needed is in each case only the ½ quantile, i.e., to put it another way, the median. The ratio of the median of the first multi-bit generator 508 to the median of the second multi-bit generator 511 produces the bias of the analog random noise source 401.

The absolute magnitude of the medians in comparison with the medians of other random number generators of a larger arrangement with a plurality of random number generators represents a figure of merit for the generation rate of the analog random noise source 201. The smaller the median, that is to say the larger the generation rate, the better the quality of the random number generator 100.

To summarize, the procedure according to the invention is as follows:

1. The analog RTS signal is supersampled with a sampling interval $\Delta T \ll \tau_a, \tau_b$.
2. The lengths or the time durations of the 0-bit sequences of the digitized RTS signal 402 that are formed by the analog/digital converter and the length or the time durations of the 1-bit sequences of the digitized RTS signal 501 are counted. In this case, two different counters are used, namely the first counter 507 and the second counter 509, the first counter 507 being provided for counting the lengths of the 0-bit sequences and the second counter 509 being provided for counting the 1-bit sequences.

Consequently, the invention clearly does not use the samples of the RTS signal as random variables, but rather the measured, i.e. the counted time durations of the signal states of the digitized RTS signal 202 which exhibit exponential distribution.

The counter value $Z_i$ is the realization of the quantization of a random variable with exponential distribution with a parameter $$\frac{1}{\tau_a} \text{ (for } i = 1\text{) or } \frac{1}{\tau_b} \text{ (for } i = 2\text{)}.$$

3. 1, 2 or more bits are generated by means of the respective multi-bit generator 508, 511, in each case in accordance with the device—described in P. Ruße (cited above)—for carrying out a multi-bit process by means of quantile formation. It should be taken into account in this connection that the multi-bit process is carried out separately for each counter, i.e. for the first counter 507 and the second counter 509, since the two counter values $Z_1$ and $Z_2$ are subject to different probability distributions.

4. The bits generated using a counter value $Z_1$ of the first counter 507 and a counter value $Z_2$ of the second counter 509 are joined together again in an arbitrary sequence and are to the greatest possible extent stochastically independent of one another and the sole dependencies result from the adaptation process for adapting the quantile variables as described in P. Ruße (cited above). Since the bits are generated irregularly (with the rhythm of the decay), the invention provides a buffering of the output bit sequences in order to enable a clocked further processing by means of the digital postprocessing unit 124.

The counter values $Z_i$, designated as Z hereinafter for reasons of simplicity, are produced by quantization (sampling) of a random variable T in each case exhibiting exponential distribution with a parameter $$\lambda = \frac{1}{\tau},$$

where $\tau$ is used as an abbreviation for $\tau_a$ or $\tau_b$.

The probability density function f of T is then given in accordance with the following specification (cf. FIG. 6):

$$f : \mathfrak{R} \to \mathfrak{R}_0^+, \qquad f(t) = \begin{cases} 0, & t < 0, \\ \lambda \cdot e^{-\lambda t}, & t \geq 0 \end{cases}. \tag{13}$$

The distribution function F where $F(t)=P(\text{``}T \leq t\text{''})$ is given in accordance with the following specification:

$$F : \mathfrak{R} \to [0, 1], \qquad F(t) = \begin{cases} 0, & t < 0, \\ 1 - e^{-\lambda t}, & t \geq 0 \end{cases}. \tag{14}$$

If, for $0 < q < 1$, the value $t_q \in \mathfrak{R}$ designates the q quantile of the distribution, i.e., to put it another way, the following holds true:

$$P(\text{``}T \leq t_q\text{''}) = q, \tag{15}$$

then the following results from the distribution function:

$$t_q = \tau \cdot \ln\left(\frac{1}{1-q}\right), \tag{16}$$

i.e. the quantiles can immediately be calculated given a known average state lifetime.

The sampling is effected with a sampling interval $\Delta T = \gamma \cdot \tau$, where $\gamma \ll 1$. The counter values Z are thus given in accordance with the following specification:

$$Z = \left\lfloor \frac{T}{\Delta T} \right\rfloor. \tag{17}$$

The probability that the counter value Z assumes a specific value $Z \in N_0$ is thus calculated in accordance with the following specification:

$$\begin{aligned} P(\text{``}Z = z\text{''}) &= P\left(\text{``}z \leq \frac{T}{\Delta T} < z + 1\text{''}\right) \\ &= F((z+1) \cdot \Delta T) - F(z \cdot \Delta T) \\ &= (1 - e^{-\lambda \Delta T}) \cdot e^{-\lambda z \Delta T} \\ &= (1 - e^{-\gamma}) \cdot e^{-\gamma z} \end{aligned} \tag{18}$$

It should be pointed out in this connection that the counter reading "0" can never be observed on account of the technical arrangement of the signal state changes. For this reason, very long state durations will also have a somewhat increased probability.

Since the following holds true for $\gamma \ll 1$ to an approximation by series expansion:

$$P(\text{``}Z=z\text{''}) = \gamma \cdot e^{-\gamma z} \tag{19}$$

the counter values Z themselves to an approximation exhibit exponential distribution with the parameter $\gamma$.

Figure 6:
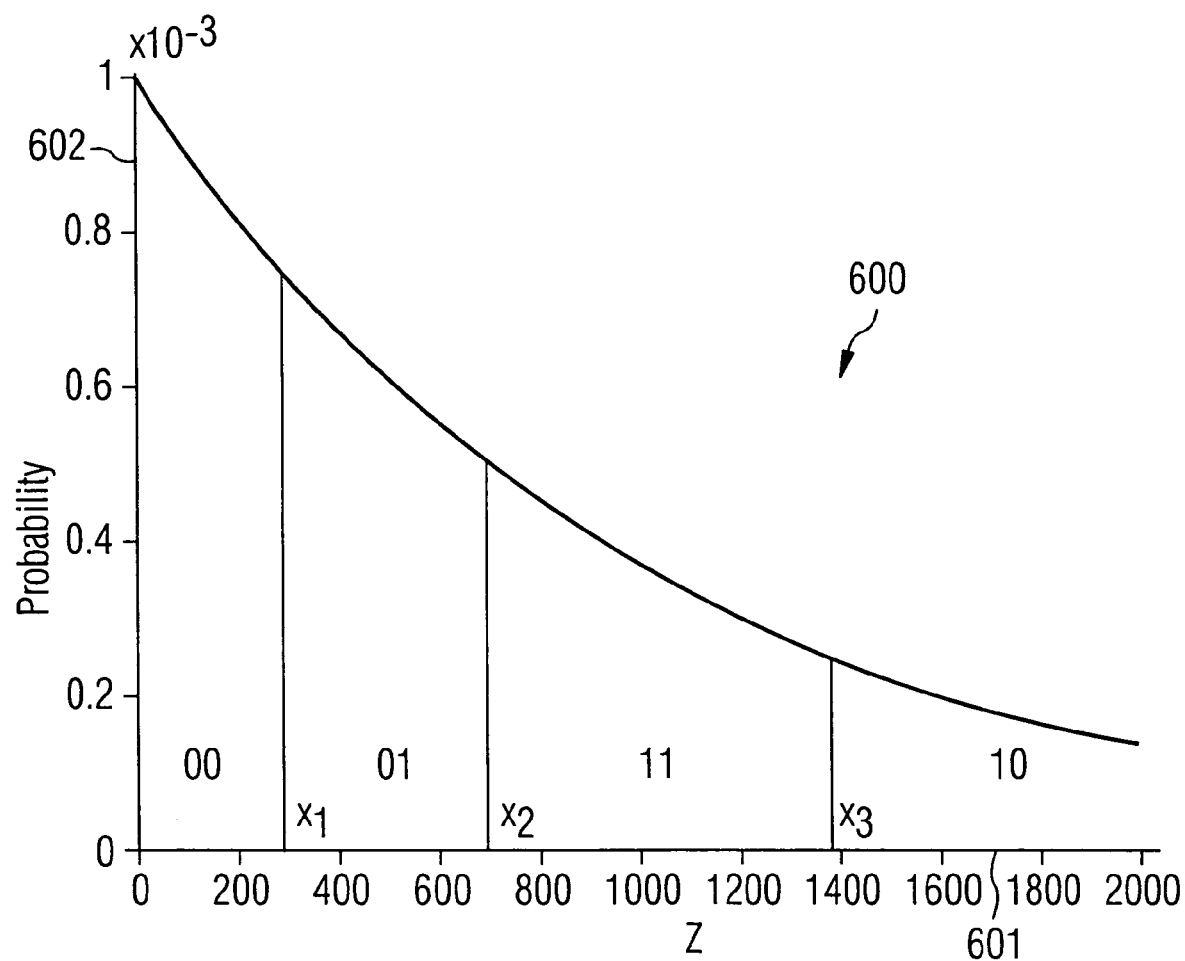
FIG. 6 shows a diagram of a probability distribution of a quantized exponential distribution of counter readings for detecting the time duration of a signal state of an RTS signal.

FIG. 6 specifies, in a function diagram 600 for a counter value Z 601, the respective probability 602 of the occurrence of the respective counter value 601. To put it another way, this means that the probability distribution for the counter value Z is illustrated in FIG. 6 for the value $\gamma = 0.001$.

In order to generate for example 2 bits per counter evaluation, the $$\frac{1}{4}$$

quantiles, $$\frac{2}{4}$$

quantiles and $$\frac{3}{4}$$

quantiles $x_1$, $x_2$ and $x_3$ are required in accordance with P. Ruße (cited above).

It follows in accordance with specification (16) that:

$$x_j = \frac{1}{\Delta T} \cdot t_{\frac{j}{4}} = \frac{1}{\Delta T} \cdot \tau \cdot \ln\left(\frac{1}{1-\frac{j}{4}}\right) = \frac{1}{\gamma} \cdot \ln\left(\frac{4}{4-j}\right) \quad (20)$$

and the following thus results for $\gamma=0.001$ by way of example (cf. FIG. 6):

$x_1=288$,
$x_2=693$,
$x_3=1386$.

In accordance with this exemplary embodiment, in the case of a concrete counter evaluation $\hat{z}$, the bit sequence "00" is generated for $\hat{z} \leq x_1$, the bit sequence "01" is generated for $x_1 < \hat{z} \leq x_2$, the bit sequence "11" is generated for $x_2 < \hat{z} \leq x_3$ and the bit sequence "10" is generated for $x_3 < \hat{z}$.

Finally, it is also possible to specify limit values for the maximum counter values for $\gamma=0.001$.

With a probability of less than $10^{-6}$, the counter value Z assumes values greater than 13 816.

With a probability of less than $10^{-9}$, the counter value Z assumes values greater than 20 723.

With a probability of less than $10^{-12}$, the counter value Z assumes values greater than 27 631.

It should be taken into account that with the given modeling $\gamma=0.001$, a lower limit is given and the specified values thus represent actual maximum values.

Since the average lifetimes $\tau_a$ and $\tau_b$ are not known exactly, the physical boundary conditions may fluctuate, a certain superposed signal interference component is present and quantization errors should be taken into account, the quantile variables are not fixedly predetermined but rather are adapted in accordance with the method described in P. Ruße (cited above).

The most important advantages of the model-driven post-processing in accordance with the exemplary embodiment of the invention are:

An increased data rate:
  1, 2 or more bits are generated per average state duration $\tau_a$ or $\tau_b$. The number of bits that can be generated depends on the fineness of the sampling. In the case of the method described in this exemplary embodiment, the data rate is for example two bits per average state duration $\tau_a$ or $\tau_b$.

A negligible bias:
  on account of the method constructions, "zeros" and "ones" are generated in a balanced manner apart from numerical errors even if the signal states a and b have a different average lifetime $\tau_a$ and $\tau_b$, respectively.

The first counter 507 and the second counter 509 are configured as 16-bit counters, which suffices since the counter value $2^{16}$ given a value $\gamma=0.001$ is exceeded for example only with a probability of less than $10^{-28}$.

In the case of counters having a smaller word width, i.e. having fewer bits, an alarm is thus correspondingly triggered by the warning device 512 with higher probability.

As an alternative to the above-described realization in accordance with the exemplary embodiment of the invention, a counter may also be dispensed with by changing the construction of the logic circuits in that one counter in each case counts 0-bit values and 1-bit values in sequence. However, two multi-bit generators have to be provided in this embodiment, too, since different stochastic distributions have to be adapted.

The invention may clearly be seen in the fact that the decay times of changing physical signal states of an RTS signal are observed, each signal state having a fixedly predetermined probability distribution of the signal state duration, which, however, may differ from signal state to signal state.

These signal time durations are measured for each signal state by means of a respective counter, alternatively just by means of one counter. The counter or the counters is or are then evaluated separately from one another with regard to their counter values, for the purpose of determining the state duration of the respective signal state, by means of quantile adaptation methods and is or are used for generating random bits.

The invention claimed is:

1. A random number generator, comprising:
   at least one transistor that generates an analog random telegraph signal (RTS signal) having a first signal state or a second signal state;
   a random telegraph signal detection unit for detecting the random telegraph signal generated by the transistor;
   a random telegraph signal sampling unit, which supersamples the random telegraph signal detected by the random telegraph signal detection unit and thus generates a digitized random telegraph signal;
   a signal state duration detection unit, which determines, from the digitized random telegraph signal, a first time variable representing a time duration of at least one first signal state of the generated random telegraph signal and a second time variable representing a time duration of at least one second signal state of the generated random telegraph signal; and
   a random number conversion unit, which is coupled to the signal state duration detection unit, and that generates a random number from the first time variable and the second time variable.

2. The random number generator as claimed in claim 1, wherein the signal state duration detection unit comprises:
   a first counter for counting successive samples of the digitized random telegraph signal which represent the first signal state of the generated random telegraph signal; and
   a second counter for counting successive samples of the digitized random telegraph signal which represent the second signal state of the generated random telegraph signal.

3. The random number generator as claimed in claim 2, further comprising a random number generator failure determining unit for determining a failure or a risk of failure of the random number generator.

4. The random number generator as claimed in claim 3, further comprising a warning device coupled to the random number generator failure determining unit and serving to generate a warning signal if a failure or an increased risk of failure of the random number generator has been determined.

5. The random number generator as claimed in claim 2, wherein the random number conversion unit has a ring memory, in which the counter values of the first counter and the counter values of the second counter are stored.

6. The random number generator as claimed in claim 2, further comprising at least one quantization unit, which is coupled to the signal state duration detection unit and quantizes the counter value of the first counter and/or the counter value of the second counter into a plurality of binary values that are fed to the random number conversion unit.

7. The random number generator as claimed in claim 6, wherein the quantization unit is set up such that quantization threshold values are configured in variable fashion.

8. A method for generating a random number, comprising the steps of:

detecting an analog random telegraph signal;

supersampling the analog random telegraph signal, so that a digitized random telegraph signal is generated;

determining a first time variable representing a time duration of at least one first signal state of the generated random telegraph signal and a second time variable representing a time duration of at least one second signal state of the generated random telegraph signal from the digitized random telegraph signal; and generating a random number from the first time variable and the second time variable.

9. The method for generating a random number as claimed in claim 8, wherein the determining step comprises the steps of:

counting successive samples of the digitized random telegraph signal which represent the first signal state of the generated random telegraph signal; and counting successive samples of the digitized random telegraph signal which represent the second signal state of the generated random telegraph signal.

10. The method for generating a random number as claimed in claim 9, further comprising the step of determining a failure or a risk of failure of generating the random number.

11. The method for generating a random number as claimed in claim 10, further comprising the step of generating a warning signal if a failure or an increased risk of failure of the random number generator has been determined.

12. The method for generating a random number as claimed in claim 9, further comprising the step of storing the counter values of the first counter and the counter values of the second counter in a ring memory.

13. The method for generating a random number as claimed in claim 9, further comprising the step of quantizing the count value of the first signal state and/or the count value of the second signal state into a plurality of binary values.

14. The method for generating a random number as claimed in claim 13, wherein a quantization threshold values are configured in variable fashion.

* * * * *